United States Patent [19]

Rosman

[11] Patent Number: 4,837,676
[45] Date of Patent: Jun. 6, 1989

[54] MIMD INSTRUCTION FLOW COMPUTER ARCHITECTURE

[75] Inventor: Andrew Rosman, Los Alamitos, Calif.

[73] Assignee: Hughes Aircraft Company, Los Angeles, Calif.

[21] Appl. No.: 233,867

[22] Filed: Aug. 15, 1988

Related U.S. Application Data

[63] Continuation of Ser. No. 668,590, Nov. 5, 1984, abandoned.

[51] Int. Cl.⁴ ............................................. G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,962,706 | 6/1976 | Dennis et al. | 364/900 |
| 3,970,994 | 7/1976 | Jenny | 364/200 |
| 4,012,725 | 3/1977 | Spangler et al. | 364/200 |
| 4,075,679 | 2/1978 | Christopher et al. | 364/900 |
| 4,128,882 | 12/1978 | Dennis | 364/200 |
| 4,130,885 | 12/1978 | Dennis | 364/900 |
| 4,145,733 | 3/1979 | Misunas et al. | 364/200 |
| 4,149,240 | 4/1979 | Misunas et al. | 364/200 |
| 4,153,932 | 5/1979 | Dennis et al. | 364/200 |
| 4,201,105 | 5/1980 | Alles | 364/719 X |
| 4,229,790 | 10/1980 | Gilliland et al. | 364/200 |
| 4,251,861 | 2/1981 | Mago | 364/200 |
| 4,292,666 | 9/1981 | Hill et al. | 364/900 |
| 4,365,292 | 12/1982 | Barnes et al. | 364/200 |
| 4,412,286 | 10/1983 | O'Dowd et al. | 364/200 |
| 4,418,383 | 11/1983 | Doyle et al. | 364/200 |
| 4,437,156 | 3/1984 | Christopher et al. | 364/200 |
| 4,450,554 | 5/1984 | Steensma et al. | 370/4 |
| 4,466,061 | 8/1984 | DeSantis et al. | 364/200 |
| 4,514,807 | 4/1985 | Nogi | 364/200 |
| 4,542,455 | 9/1985 | Demeure | 364/200 |
| 4,630,258 | 12/1986 | McMillen et al. | 370/60 |

FOREIGN PATENT DOCUMENTS

| | | |
|---|---|---|
| 0014152 | 8/1980 | European Pat. Off. |
| 0020255 | 1/1985 | European Pat. Off. |
| 2549673 | 1/1985 | France |
| 59-135953 | 8/1984 | Japan |
| WO84/01077 | 3/1984 | PCT Int'l Appl. |

OTHER PUBLICATIONS

The Hybrid Cube Network, R. J. McMillen et al.; Distributed Data Acquisition, Computing & Control Symposium; Dec. 1980, pp. 11-22.

(List continued on next page.)

*Primary Examiner*—Raulfe B. Zache
*Assistant Examiner*—Florin Munteanu
*Attorney, Agent, or Firm*—C. D. Brown; A. W. Karambelas

[57] ABSTRACT

A computer which achieves highly parallel execution of programs in instruction flow form, as distinguished from data flow form employing a unique computer architecture in which the individual units such as, process control units, programmable function units, memory units, etc., are individually coupled together by an interconnection network as self-contained units, logically equidistant from one another in the network, to be shared by any and all resources of the computer. All communications among the units now take place on the network. The result is a highly parallel and pipelined computer capable of executing instructions or operations at or approaching full clock rates.

Each process control unit initiates its assigned processes in sequence, routing the first instruction packet of each process through the network and addressed memories and function units back to the initiating process control unit where it is relinked with its process. As each instruction packet is routed, the initiating process is suspended until relinking occurs. Because the instruction flow computer is fully pipelined, the first instruction packet of the second process follows on the next machine cycle, and so on, until all of the processes have been initiated, providing time sharing of a single pipeline by multiple instruction packet streams.

9 Claims, 9 Drawing Sheets

OTHER PUBLICATIONS

Message-Switching Networks with Alternate Routing, U. Herzog; Proceedings of the International Teletraffic Congress, Stockholm, Jun. 13-20, 1973; Proc. 7, Part 2 Swedish Communications 173 (Stockholm, Sweden); pp. 415/1-415/8.

The Gamma Network: a Multiprocessor Interconnection Network Redundant Paths; D. S. Parker et al.: Conference Proceedings, The 9th Annual Symposium on Computer Architecture, Apr. 26-29, 1982; pp. 73-80.

Design and Implementation of the Banyan Interconnection Network in TRAC, U. V. Premkumar et al.; AFIPS 1980 National Computer Conference, Jun. 1980; pp. 643-653.

The Multistage Cube: a Versatile Interconnection Network, H. J. Siegel et al.; Computer, vol. 14, Dec. 1981; pp. 65-76.

Architecture and Applications of the HEP Multiprocessor Computer System, B. J. Smith; SPIE, vol. 298, Section on Real-Time Signal Processing IV, Aug. 1981; pp. 241-248.

Performance and Implementation of 4×4 Switching Nodes in an Interconnection Network for PASM, R. J. McMillen et al.; 1981 Int'l Conf. on Parallel Processing, Aug. 1981; pp. 229-233.

LSI Implementation of Modular Interconnection Networks for MIMD Machines, L. Ciaminiera et al.; 1980 Int'l. Conf. Parallel Processing, Aug. 1980, pp. 161-162.

Analysis and Simulation of Buffered Delta Networks, D. M. Dias et al.; IEEE Transactions on Computers, vol. C.30, No. 4; Apr. 1981; pp. 273-282.

A 4×4 Modular Crossbar Design for the Multistage Interconnection Networks, A. C. Hung et al.; Real Time Systems Symp., Dec. 1981; pp. 3-12.

Processor-Memory Interconnections for Multiprocessors, J. H. Patel; 6th Annual Int'l Symp. Computer Architecture, Apr. 1979; pp. 168, 177.

Switching Strategies in a Class of Packet Switching Networks, M. Kumar et al.; Conference Proceedings, The 10th Annual International Symposium on Computer Architecture, Stockholm, Sweden; 1983; pp. 284-300.

A Parallel Processor for Evaluation Studies, G. J. Nutt; Proceedings of the National Computer Conference, New York, Jun. 7-10, 1976; pp. 769-775.

The Polycyclic Processor, B. G. Chatterjee; IEEE International Conference on Computer Design: VLSI--Computers; 1983; pp. 84-87.

Multi-Microprocessor Based Architecture for Space Borne Packet Switch, P. N. Jean et al.; CONCOM 80, 20th IEEE Computer Society International Conference (San Francisco, U.S.); Feb. 25-28, 1980; pp. 139-142.

Programming Design Features of the Gama 60 Computer, P. Dreyfus; Proceedings, Eastern Joine Computer Conference 1958; pp. 174-181.

Chapter 13, a Multiple Instruction Stream Processor with Shared Resources, M. J. Flynn et al.; Parallel Processor Systems, Technologies, and Applications, Symposium, Jun. 25-27, 1969; pp. 251-286.

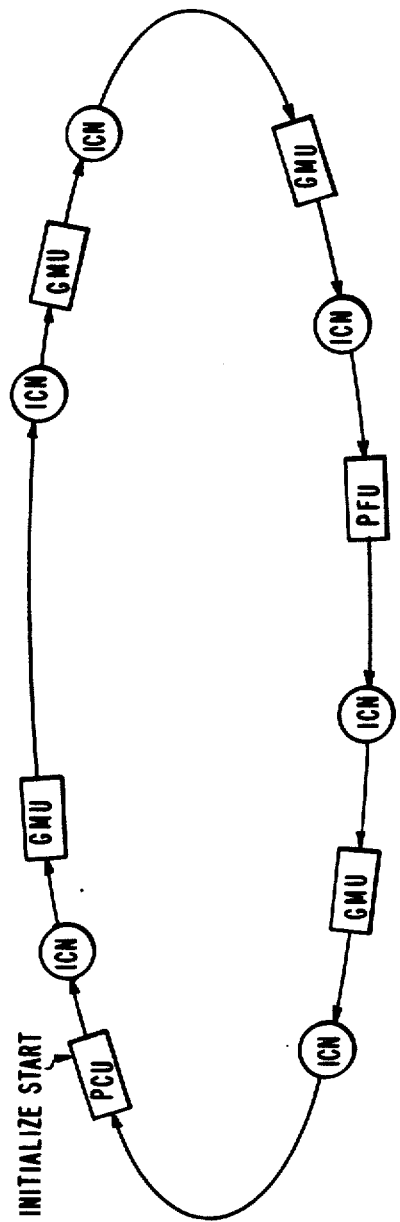

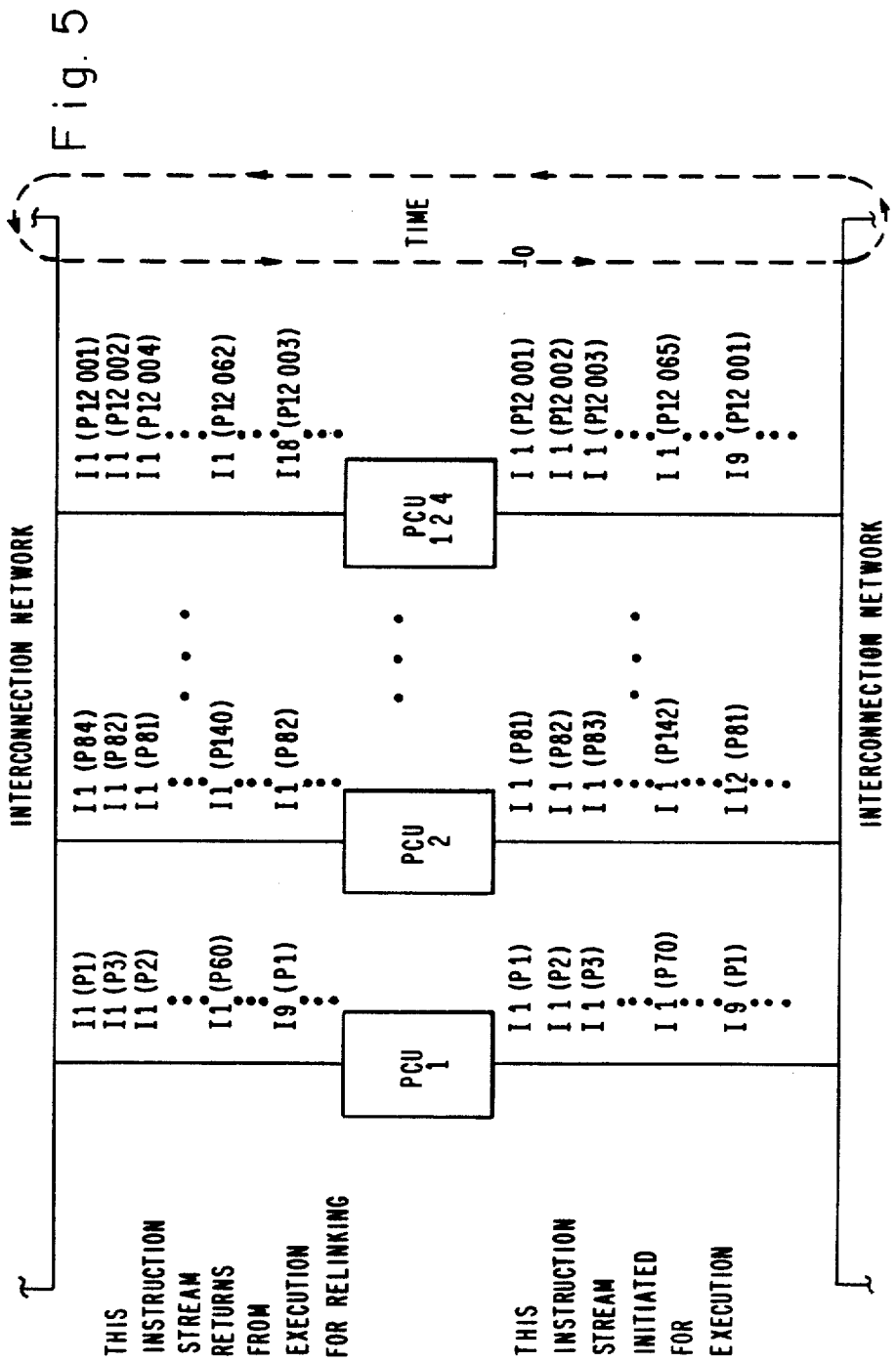

MIMD INSTRUCTION FLOW COMPUTER ARCHITECTURE

This application is a continuation application of application Ser. No. 06/668,590, filed Nov. 5, 1984, revived for purposes of continuity, now abandoned.

BACKGROUND OF THE INVENTION

1. Field of the Invention

This invention relates to data processing and, more particularly, to architectural improvements in multiple instruction stream, multiple data stream computers for directly and efficiently executing highly parallel user programs or a plurality of user programs.

2. Background of Related Art

The current state of the art in high performance parallel processing is generally limited to super computers and array processors optimized to execute single instruction multiple data stream vectorized programs. These computers are further optimized to execute code vectorized to specific lengths and are not designed to execute multiple instruction stream, multiple data stream (MIMD) programs.

Multiple instruction stream, multiple data stream computers have been proposed and in a few cases implemented. U.S. Pat. Nos. 4,153,932 and 4,145,733 describe data flow computers. Practical implementations of data flow computers are difficult to achieve, in part, because of the difficulty in designing a computer organization which efficiently executes a data flow language.

Multiple instruction stream, multiple data stream computers have been implemented. An example being Denelcor's heterogeneous element processor, an embodiment of which is described in U.S. Pat. No. 4,229,790 to Gilliand et al. The heterogeneous element processor is an interconnected multi-processor computer. A processor utilizes pipelined control and function units. Penalties due to precedence constraints are reduced by switching instruction context among parallel processes at the pipeline cycle rate. The heterogeneous element processor architecture is not sufficiently cost efficient nor sufficiently extensible for many applications. This is largely due to a complex processor organization and low function unit utilization. The use of multiple data streams, as proposed by Gilliand et al, connected to the processor pipeline via task snapshot registers, still results in processing speeds which are limited by the availability of the resources of a single processor.

Other earlier types of multiprocessor computers involved two types of implementation. The first type uses separate processing units, one for each data stream. The second type uses one central processing unit which is in effect multiplexed among the several data streams. The use of separate processing units is costly and results in a single instruction stream, single data stream architecture which is subject to precedence problems. By employing the second type of implementation, the central processing unit may be multiplexed among the several data streams in a way to reduce precedence constraints.

Still other attempts to improve processing speeds and to minimize contention problems are described in "Parallel Processor Systems, Technologies, and Applications," Symposium, June 25–27, 1969, Chapter 13 entitled "A Multiple Instruction Stream Processor with Shared Resources," M. J. Flynn, A. Podvin and K. Shimizu. Here, a parallel computer system organization is described using individual computers, each of which contains its own data and control registers but lacks the more substantial execution facilities which, in turn, are shared by all machines. Sharing is accomplished by closely synchronized time-phased switching. Heavy pipelining of the execution resources is used in an effort to provide maximum operational bandwidths. The pipelining factor for each of the execution functions of the execution resources is necessarily closely related to the synchronizing factor of the individual computers. The system based upon this organizational concept is claimed to avoid many of the contention problems associated with shared resource systems.

In the paper by Flynn et al, the individual computers are described as processors, each of which is responsible for fetching its own operands and preparing its own instructions. The processor does not execute its instruction, but rather requests the execution resource or unit to do so. The execution unit is shared by 4 time-phased arrays or rings of processors, each ring contains 8 processors. The arrangement requires close time synchronization of the processors and no two processors within a ring are in the same phase of instruction, preparation or execution. Since individual processors from different rings can contend for execution resources at a particular time slot, it is necessary that the contention be time overlapped with operand fetch and so forth. When two or more processors request a resource which can accept only one operation, a priority system is used to resolve the conflict.

SUMMARY OF THE INVENTION

This invention is directed to a new computer embodying an instruction flow concept as distinguished from a data flow concept. This computer embodies a unique computer architecture which provides high speed parallel computing; is well suited for implementing highly parallel algorithms; and is conveniently structured using a very large-scale integrated circuit implementation, in that the architecture requires the design of only a few very large-scale integrated circuit chips, which are extensively replicated in the unique system configuration.

This instruction flow computer departs from multiprocessor architectures, such as those discussed hereinabove, by taking the processor components or units traditionally within the processor, such as process control units, function execution units, local memory units, and bus structure, and connecting them by means of an interconnection network as individual self-contained units, preferably logically equidistant from each other in an architectural arrangement whereby the units are shared by any and all resources of the computer.

The process control and function units are now simple units connected to the ports of the interconnection network and replace the large complex processor as a unit at a network port. The bus structure internal to the conventional processor is now replaced by the regular, but larger, interconnection network. One or more global memories coupled to the interconnection network now replace the memory functions of the individual processors. All communications among the units now take place on the interconnection network in a pipelined configuration for the computer. Thus, all of the units coupled to the network can be pipelined at speeds at or approaching full clock speed.

Process control units which provide process control are assigned a set of processes, each of which has an independent block or packet of sequential instructions. Each process control unit initiates its assigned processes in sequence, routing the first instruction packet of the sequential instruction packets of the first process via the interconnection network to others of said units in the network addressed by said instruction.

The first process is immediately suspended until the initiated instructions of the first instruction packet have been executed and relinked to its process.

Because the instruction flow computer is fully pipelined, the first instruction packet of the second process follows on the next machine cycle and so on until all of the processes have been initiated. This execution sequence provides time sharing of a single pipeline by multiple instruction streams.

This instruction flow computer provides a number of advantages over current parallel processing architectures, in that it executes highly concurrent programs directly and efficiently. It provides parallelism and extensibility limited only by implementation technology. Its modular nature reduces design and implementation cost, lowers replacement cost and programming cost.

Other advantages of this invention will become apparent from a study of the following specification when considered in conjunction with the accompanying drawings.

BRIEF DESCRIPTION OF THE DRAWINGS

FIG. 3 illustrates a typical instruction flow in the instruction flow computer of FIG. 2;

FIG. 4 illustrates one typical format of an instruction packet;

FIG. 5 depicts one typical sequencing of instructions of parallel instruction streams in the instruction flow computer;

DETAILED DESCRIPTION OF THE PREFERRED EMBODIMENT

Prior Art Computer

Figure 1:
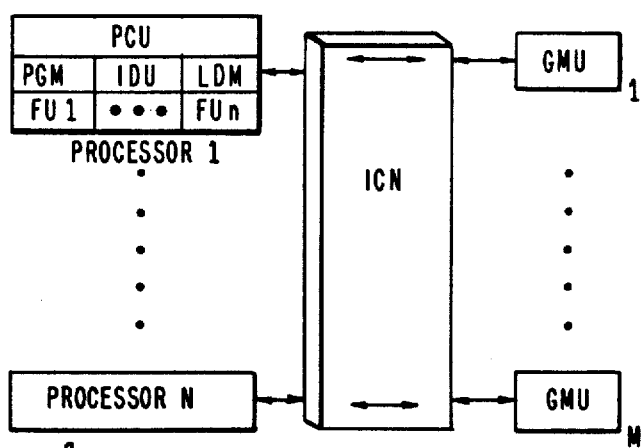
FIG. 1 depicts a multiple processor type of computer typically representative of the prior art.

FIG. 1 illustrates a type of parallel processing computer, embodying aspects of the prior art, in the use of individual processors, processor 1 through processor N, which are coupled in parallel to a bidirectional interconnection network, ICN. Global memory units (GMU), are coupled with the processors through the bidirectional network as individual memories external of the processors. Thus, data traffic between the processors and the global memory units traverses the bidirectional interconnection network ICN in both directions. The processors conventionally include, as shown in connection with processor 1, a program memory (PGM), an instruction decode unit (IDU), a local data memory (LDM), a control unit (CU), and function units (FU).

These main functions as well as register sets and input/output are interconnected through a complex multibus structure. This structure requires a complex control system. Conventionally the implementation of such a control system requires expensive random logic and/or slow control store. Intermediate programming; assembly, micro and nano, are incorporated to support this control level. In addition, the efficiency of the processor is limited by the fact that many clock cycles are required to execute a higher level instruction.

Conventionally, the processors and the global memory units are connected by a bidirectional type of network, as shown, or by two unidirectional networks.

Instruction Flow Computer

Figure 2:
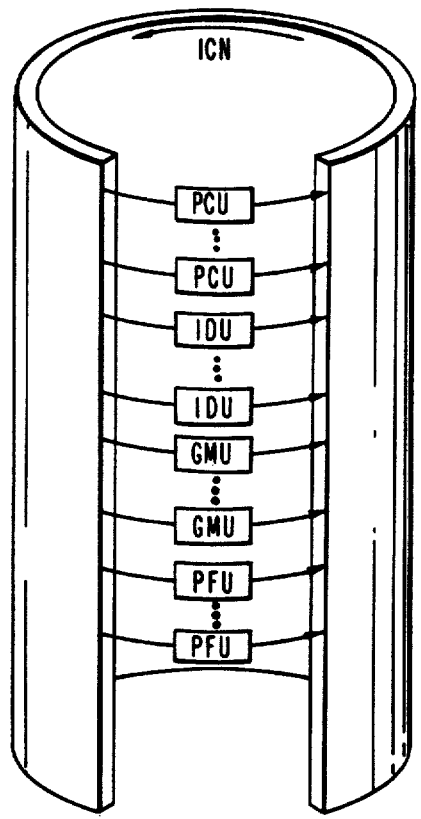
FIG. 2 depicts an instruction flow computer according to this invention as configured employing a multi-stage interconnection network.

Referring now to the unique instruction flow computer of FIG. 2, there is illustrated a network of interconnected process control units (PCU), global memory units (GMU), and programmable function units (PFU). Optionally, instruction decode units (IDU) may be included as a part of the instruction flow computer. Memory management units and input/output units may also be incorporated in this instruction flow computer operating in stand alone mode. These units are preferably fully interconnected by the network and logically equidistant from one another across the network and can be shared among the instruction streams. The instruction streams are initiated by the process control units which are individually assigned sets of processes on a real time demand basis. The individual blocks or packets of instructions of the respective sets of instructions are routed through the interconnection network.

The fully interconnected architecture implied in FIG. 2 requires a high communications bandwidth between the units. The number of units and their operational rates determine that bandwidth. For example, if the units operate at 1 MHz per instruction, then a 16 unit instruction flow computer requires at least a 16 MHz interconnection bandwidth, a rate attainable with bus architectures.

Higher bandwidth required for larger instruction flow computers using faster units dictate a multi-stage interconnection network approach. Cross bar, ring and multi-stage networks, provide the cost performance required for small, medium and large interconnections, respectively.

FIG. 2 generally illustrates a presently preferred implementation of the instruction flow computer of this invention. The depicted configuration represents a multi-stage network architecture, of the type shown in FIG. 11, which is particularly well suited to pipelined organizations. Very high performance is attainable by pipelining all the units as well as their interconnection. Ideally, clock rate instruction execution is achievable, resulting in a performance directly proportional to the number of function units and the basic clock rate. A multi-stage interconnection network, of the type of FIG. 11, constructed from N by M packet switched nodes, as described in a copending application of R. J. McMillen and A. Rosman, Ser. No. 06/661,996, filed 10-18-84, now U.S. Pat. No. 4,630,258, assigned to the assignee of this invention, the subject matter of which is incorporated herein by reference, can provide high bandwidth communications among all units. The performance of such an interconnection network can exceed 80% efficiency under loading conditions exceeding 90%. The performance of the instruction flow computer is then the product of the performance efficiency of the interconnection network E(N), the number of function units N(FU), and the machine cycle rate F.

$$Performance = E(N) \times N(FU) \times F$$

A peak rate can be obtained for well partitioned problems, resulting in efficiencies close to 1.0.

As will be seen in comparing the general computer architecture of FIG. 2 with that of FIG. 1, the instruction flow computer departs from the conventional parallel processor computer architecture in that it is not a network of interconnected processors. Instead, this invention takes the components or units, traditionally within the processor, providing control, execution and memory functions and logically couples them as self-contained simple units by means of an interconnection network so that they may be shared by all of the resources. Instruction streams originating from the processes of the individual process control units (PCU) are continually moved around the computer through the network until their execution is completed. At any one time many instructions belonging to as many independent processes exist in various stages of execution.

In this arrangement, the processes comprise independent blocks or packets of sequential instructions; such as, subroutines. Sets of processes are assigned statically or dynamically to each process control unit. Each process is then represented by an identification or address, status information and the equivalent of a program counter. At the start, each process control unit initiates its first instruction from its first process. After each process is initiated by a process control unit, its first or current instruction packet is sent to other units in a predetermined sequence, in accordance with addresses determined at compilation time. The first process is now suspended. The instruction flow, for example, proceeds through the computer from a memory unit for fetching data, to a function unit; to a memory unit and back to the process control unit. The next instruction of the same process is initiated only upon the arrival or return of the preceding instruction; thus, avoiding the precedence constraints encountered in sequential processing.

The instructions are in the form of packets of information. Because this instruction flow computer is fully pipelined, while one instruction packet is moving through the computer, the process control unit initiates another process and the first instruction packet of that process is routed through the computer to be followed by the first instruction packet of yet another process until all processes have been initiated. This execution sequence amounts to time sharing a single pipeline by multiple instruction streams. The instruction packets flowing through the computer are routed to "free" function units resulting in very efficient hardware utilization. Explanations with respect to this will appear at a later point.

Instruction Flow

The instruction flow will be better understood by reference to FIGS. 3 and 4 showing a typical instruction flow and a corresponding instruction format. As seen in FIG. 4, the instruction originates at the process control unit (PCU) and is provided with a tag (TAG) or address and a link (LINK), which will be used when the instruction is returned to the process control unit to relink the instruction with the specific process. There follows an instruction address which identifies a global memory unit at which the particular instruction is to be picked up and an address for a global memory unit at which operand number 1 and the data therefor is to be picked up. This is followed by an address for a global memory unit at which data for operand number 2 is to be picked up. In the next stage of the instruction format, the address (TAG) of the programmable function unit to be used is identified and the operational code (OP CODE) identifying the function to be performed thereat is identified. In the last block of the instruction format, the address at which the resultant of this operation is to be stored is identified; that is, the global memory unit in which the result is to be stored is identified.

Now with respect to FIG. 3 depicting the instruction flow, the implementation of this instruction is evident. The process is initialized at the process control unit (PCU) and the first instruction packet thereof is passed by the interconnection network section (ICN) to the first global memory unit (GMU) which has been addressed. Here, the instruction is picked up. Next, the instruction goes to the second global memory unit where the operand number 1 is picked up and replaces its no longer needed address. From there, the instruction flow continues through the interconnection network to the next addressed global memory unit (GMU) at which operand number 2 is picked up. The instruction flow now proceeds through the interconnection network to the addressed programmable function unit (PFU), at which point the processing function identified by the operational code (OP CODE) of the instruction format takes place. To get to the appropriate function unit, the interconnection network, as will be described, uses the tag (TAG) to route the instruction to the most accessible programmable function unit. The function units may provide floating point functions, fixed point functions, and special functions, such as, transcendental function generation. The mix of function units and their numbers are open to application dependent configurability. Upon completion of the processing function, the resultant is then passed through the interconnection network to the addressed global memory unit (GMU) at which the processing function resultant is to be stored, as identified by the last block of the instruction format (FIG. 4). The instruction flow now continues returning to the process control unit where it is relinked with the initiating process identified by "LINK," in the format as seen in FIG. 4.

The program counter at the process control unit is now incremented and the next instruction of that process is now ready to enter the pipeline, i.e., the interconnection network. The last instruction of a particular process, upon return to the initiating process control unit, signals that process control unit to terminate that process. The state of that last instruction is now set to indicate that the process is complete.

From the foregoing, it will be seen that the process control units (PCU) initiate and terminate all processes.

A process is defined herein by sequential lists or blocks of instructions individually arranged as an instruction packet. Processes are generally independent of each other. Typically, they are subroutines of a large program.

Sequencing of Instructions

FIG. 5 shows the sequencing of instructions belonging to a number of parallel processes. Instruction 1 of process 1 is identified as I1(P1), instruction 9 of process 1 as I9(P1), etc. Here, a plurality of process control units provide instruction flows coupled through the interconnection network. The direction of the instruction flows is depicted by the dotted loop on the right side of FIG. 5. The instruction flows proceed from the process control units through the interconnection network to one or more global memory units, as seen in FIG. 3, and programmable function units, back to the initiating process control unit. Each process control unit, as will be described in FIG. 7, includes a set of program counters which keep track of the different processes.

Instruction Format with Chaining

Figure 6:
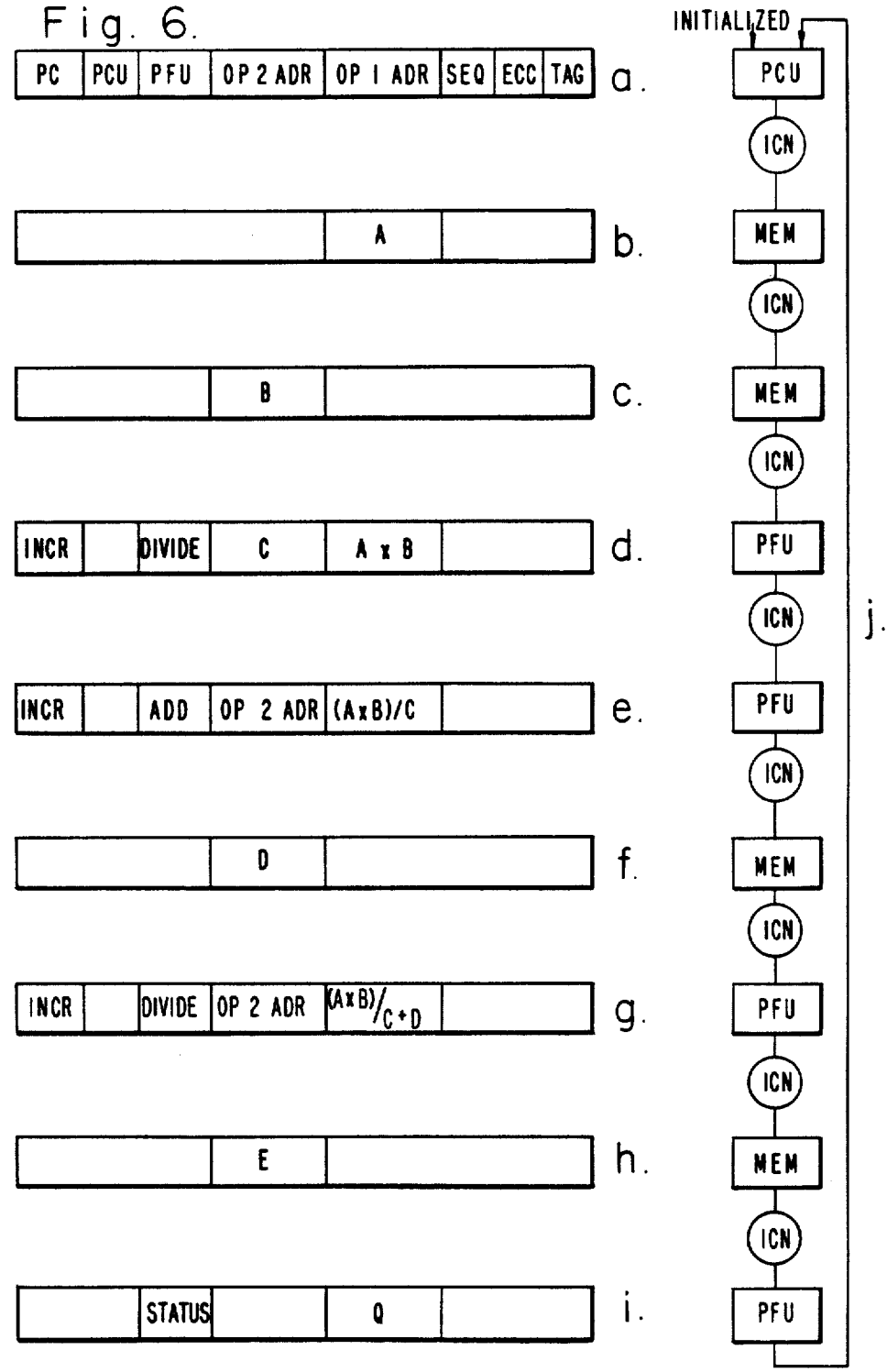
FIG. 6 illustrates a typical instruction packet format with chaining and its execution.

The instruction format with chaining is shown in FIG. 6. The instruction format with chaining is explained in processing the following expression:

$$Q < = [(A \times B)/C + D]/E \quad C \text{ is a constant}$$
$$\text{IF } (Q \text{ GT } 1) \text{ THEN} \ldots$$
$$\text{ELSE} \ldots$$

Chaining minimizes communication and maximizes function unit utilization to increase performance efficiency. It is achieved by providing an instruction format directing the process flow through memory to pick up new operands and through function units for performing the requested operation. Program memory and constant memory are provided at the function units to support and enhance the chaining mechanization and operation.

View (a) of FIG. 6 depicts a chained instruction for processing the expression above to obtain Q. This chained instruction is initiated by the process control unit (PCU) in view (j) which depicts the instruction flow. The block labeled (TAG) identifies the destination address presently used by the interconnection networks. The block labeled (ECC) identifies error checking and correction. The block labeled (SEQ) identifies the sequence code. Operand 1 and its address (OP1 ADR) is identified by address and data and also by resultant address and data. Operand 2 and its address (OP2 ADR) is similarly identified. A programmable function unit (PFU) is identified by unit and type. The process control unit number and link is identified in the block (PCU). The block labeled (PC) in view (a) identifies the program counter. In use, the chained instruction is read from right to left. The instruction flow will be understood from the description of FIG. 3 and FIG. 4 above, and the following explanations.

Upon initialization of the instruction by the process control unit the instruction flows through the interconnection network to the first addressed memory (MEM) where the term A is picked up, view (b). The instruction flow continues through the interconnection network to the second addressed memory (MEM) where the term B is picked up, view (c). The instruction flow continues through the interconnection network to the first addressed programmable function unit (PFU) where the term A is multiplied by the term B. Here the divide instruction and operand C are extracted from the program memory and constant memory, respectively, view (d). At the second programmable function unit the divide operation takes place and the add instruction is picked up, view (e). At the next addressed memory the term D is picked up, view (f), and added to the mathematical expression, as thus far developed, in the next addressed programmable function unit (PFU), view (g). At the next addressed memory (MEM) the last term E is picked up, view (h), and following the instruction "divide", view (g), divides the expression as developed at this point by the value of term E in the last addressed programmable function unit (PFU) to produce Q, view (i). The status of the divide instruction, Q Gt 1 is set and the instruction is now relinked with the process control unit, whereupon further instructions of the process of which this expression was a part, may be initiated as derived from the conditional branching instruction.

Process Control Unit

Figure 7:
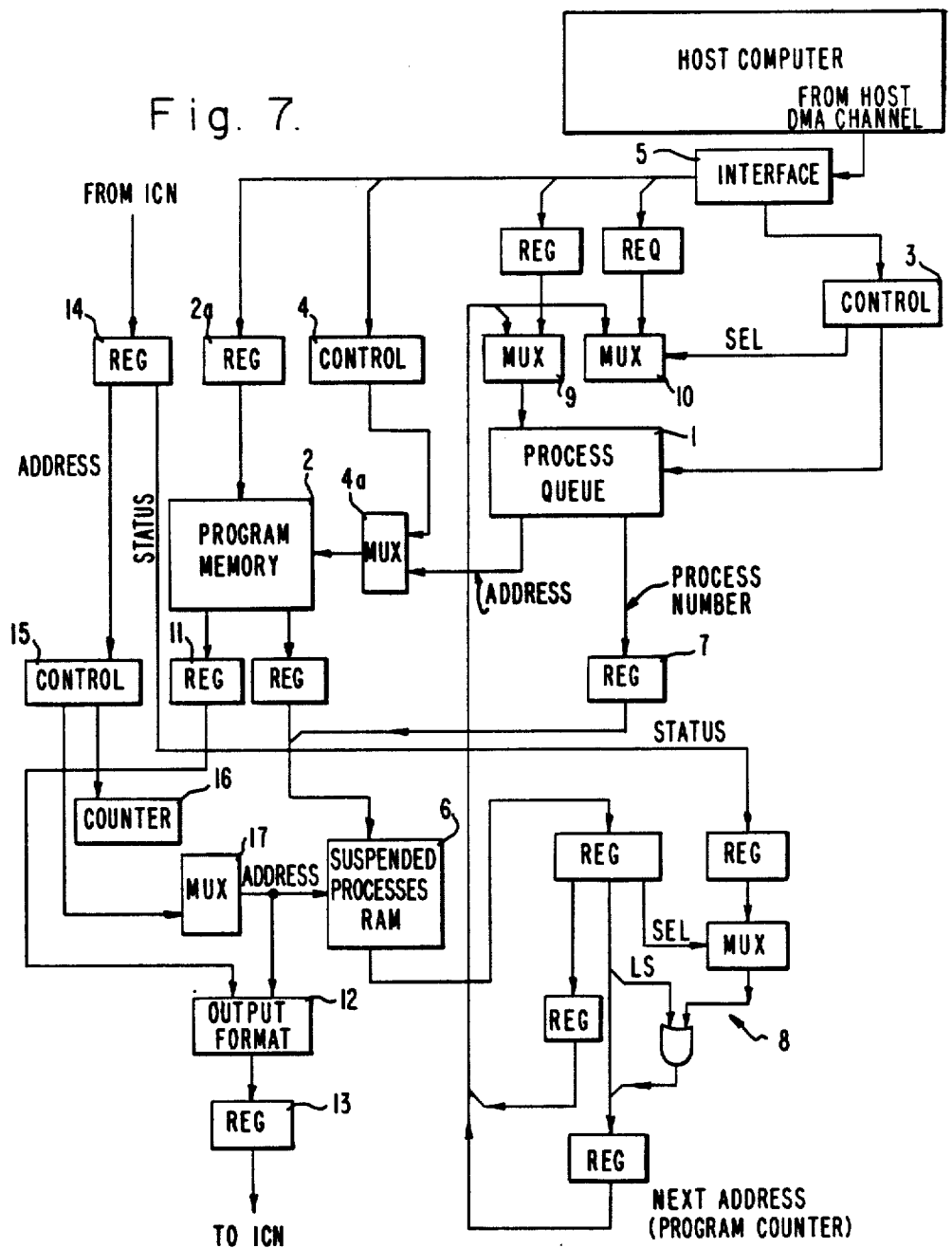
FIG. 7 is a block diagram of a typical process control unit employed in the instruction flow computer.

Details of a typical process control unit are illustrated in FIG. 7. Here, the different processes are stored in a process queue 1. The processes are identified by a process number and their individual instructions by an address. A program memory 2 stores one or more user programs. The process queue 1 and the program memory 2 are under the control of a host computer via a direct memory access channel. The host computer and the direct memory access channel are well known items and are not shown in detail since neither are essential to an understanding of this invention. The process queue 1 and the program memory 2 are controlled by respective control units 3 and 4 through a bus interface 5 coupled between the direct memory access channel of the host computer and these respective control units. Inputs from the host computer to the program memory 2 are coupled via a register 2a while addresses from the process queue 1 to the program memory 2 are multiplexed by a multiplexer 4a controlled by control unit 4. A random access memory (RAM) 6 keeps track of suspended processes. As the processes are initiated, the process numbers are coupled via a register 7 to the random access memory 6. As each process number is stored in the random access memory, the output of the random access memory via the circuit 8 and multiplexers 9 and 10 is instrumental in controlling the process queue 1 to suspend further instructions from those processes. After the initiation of each process by the process queue, the instruction flow packet for that particular process is coupled via a register 11 from the program memory 2 to an output format unit 12 which, in turn, is coupled to the interconnection network (ICN) by a register 13. Thus, an instruction packet having a typical instruction format, such as depicted in FIG. 4 or FIG. 6, is coupled to the interconnection network.

Once the processing function of that particular instruction packet has been completed and the results stored in the addressed location of a global memory unit, as in FIG. 3, the instruction goes back to the process control unit which initiated it. Upon arrival of this instruction at the process control unit, it is coupled via a register 14 and control unit 15 to a suspended process counter 16. This increments the suspended process counter, the output of which is an address coupled by a multiplexer 17 to the random access memory 6 which stores the numbers of the processes which have been initiated. The output of the random access memory which is now produced is again coupled via the circuit 8 and multiplexers 9 and 10 to the process queue and, in effect, reawakens the process associated with the instruction which has just returned from the interconnection network (ICN), so that the next instruction in sequence for that process may be initiated for processing. Circuit 8 performs conditional branching according to the status returned from the programmable function unit (PFU). When the end instruction of a particular process is returned to the process control unit, that end instruction, of course, will signal the process control unit to terminate that process.

Fetching Operations

Figure 8:
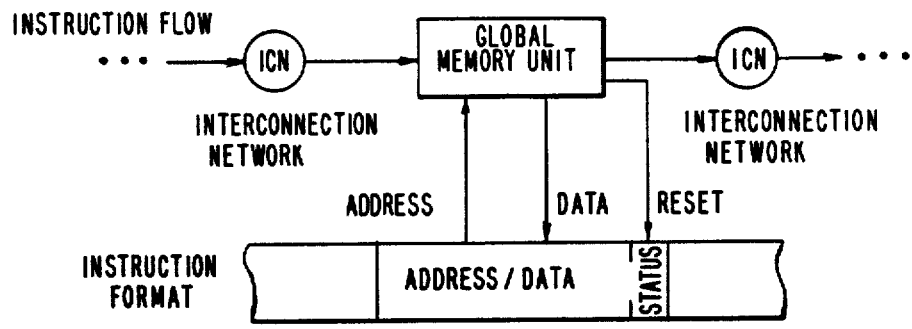
FIG. 8 depicts a visualization of a fetching operation at a global memory unit in this instruction flow computer.

FIG. 8 illustrates the way in which a fetching operation at a global memory unit exchanges the data at the global memory for the address of the instruction packet and then resets the packet status. The instruction flow is coupled via the interconnection network into a particular global memory unit. The instruction format, see FIG. 4, contains an address for a location in that global memory unit and identifies the data which is to be exchanged for that address. Thereafter, a signal from the global memory unit resets the packet status to indicate that the information exchange has taken place. The output of the global memory unit is now coupled through the interconnection network to the next addressed unit of the computer.

Programmable Function Unit

Figure 9:
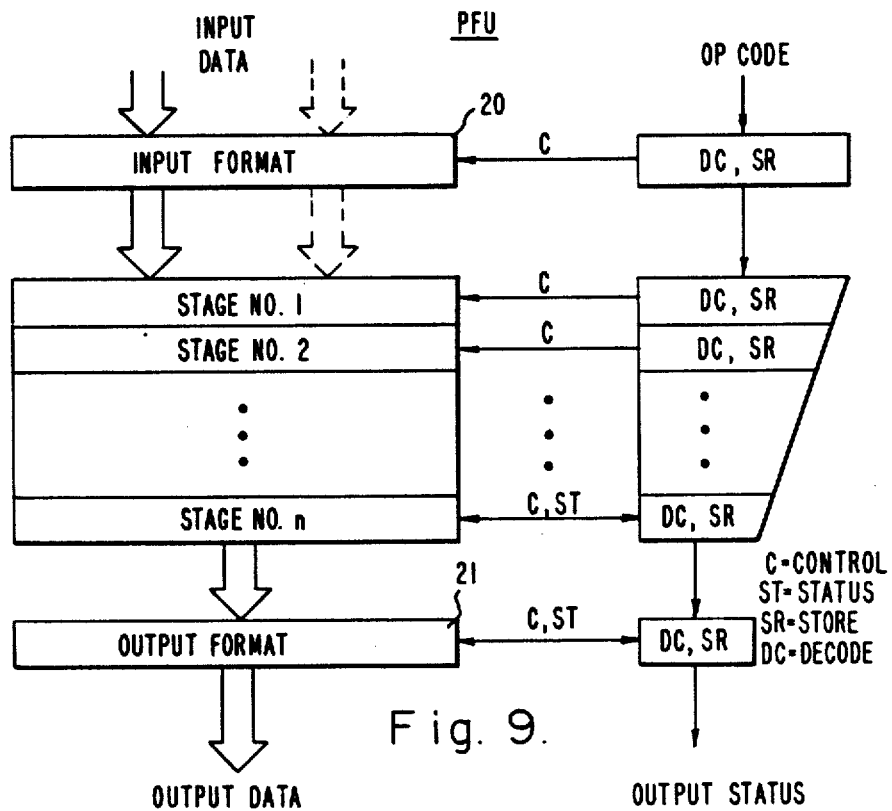
FIG. 9 depicts the information flow and action at a typical pipelined programmable function unit in this instruction flow computer.

A typical pipeline of a programmable function unit is visualized in FIG. 9. Here, input data together with its operational code is coupled from a global memory unit via the interconnection network to the input of the addressed programmable function unit. The pipeline of the programmable function unit comprises an input format section 20 and individual processing stages numbered 1 through n. Individual decoding and storing stages (DC, SR) receive the operational code (OP CODE) and individually control respective ones of the processing segments 1 through n, depending upon the operational code which is received. The processed data or output data is coupled via an output format section 21 into the interconnection network. Programmable function units that perform such complex operations as floating point "add" and "multiply" in clock rate pipelined hardware are now available in VLSI single chips.

Figure 10:
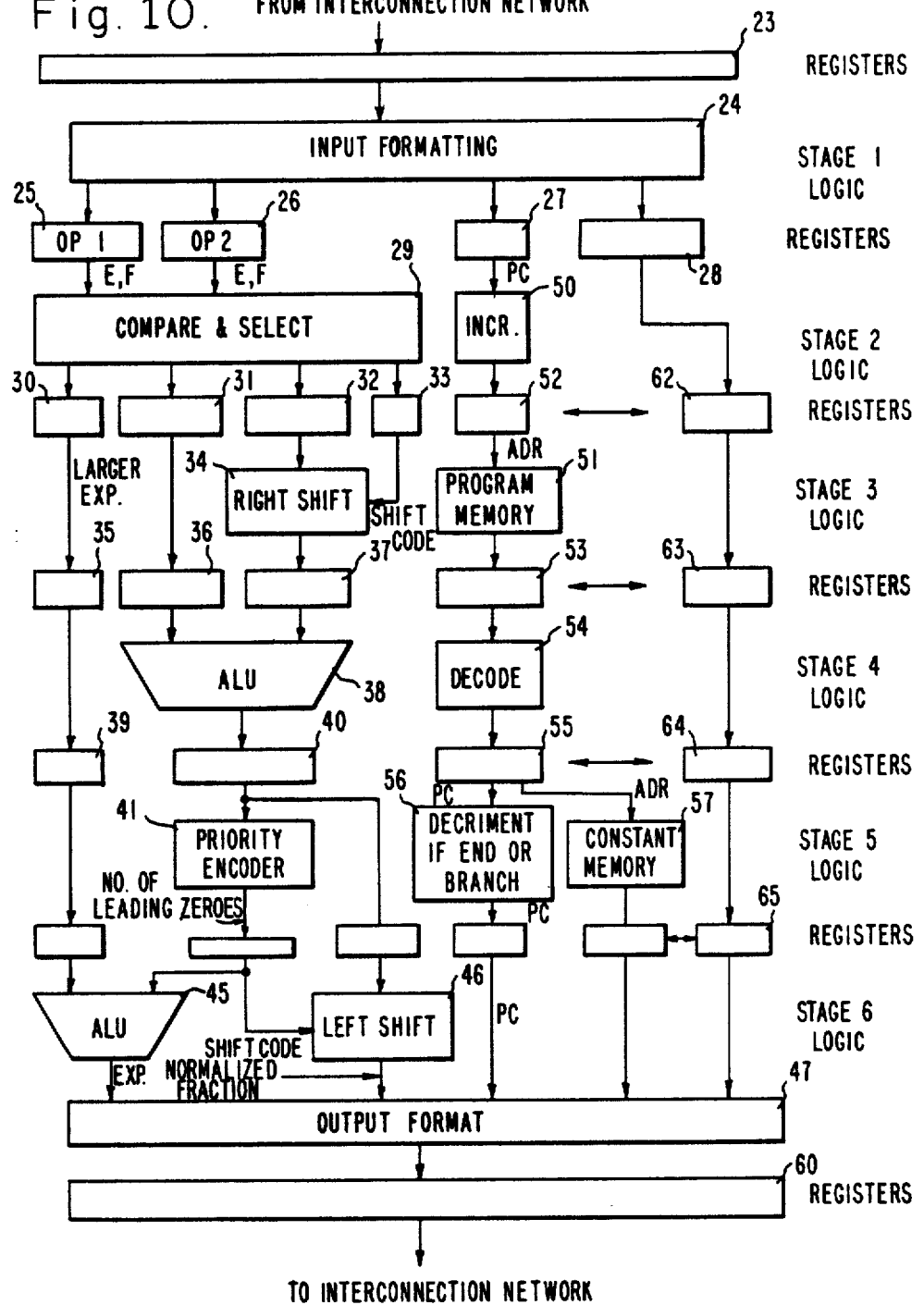
FIG. 10 is a block diagram of a programmable function unit with a program memory and a constant memory.

An example of a programmable function unit depicting a floating point adder is illustrated in the block diagram of FIG. 10. The input data to this function unit from the interconnection network is received in a register stage 23 and passed to the stage 1 logic circuits 24 where instruction input formatting takes place. Here, operands 1 and 2 are developed together with their instructions and addresses; the program count is developed (PC); and, the operational code is developed. Registers 25 and 26 receive the operands, their instructions and addresses. Register 27 receives the program count and register 28 receives the operational code.

A compare and select control 29 forming part of the stage 2 logic receives the operand data and arranges it for processing in accordance with the mathematical expression therefor as defined in the instructions whereafter it is directed through the function unit registers and logic circuits according to the addresses. Registers 30, 31, 32 and 33 store the output of the compare and select unit 29, sorted according to exponent values and including shift codes as required.

The outputs of these registers are processed through the shift circuit 34 forming part of the stage 3 logic circuits and stored in buffer registers 35, 36 and 37.

An arithmetic and logic unit 38 forming part of the stage 4 logic performs initial arithmetic operations which are stored in register 40 of the next stage of registers in the arithmetic chain including register 39.

Priority encoding follows in the stage 5 logic process in the priority encoder 41 and is passed to the circuits of the stage 6 logic through the intervening registers where further arithmetic processing, in the arithmetic logic unit 45, in developing the exponent and in the left shift circuit 46, for developing the normalized function, completes the arithmetic process. This processed data is coupled to the output formatter 47.

The program count PC is processed through the logic stages including a program count incrementer 50 in logic stage 2, a program memory 51, logic stage 3, which receives the address of the specific program from the incrementer via register 52.

A decoder 54 in logic stage 4 decodes the program memory data received via register 53 providing a program count and a program memory address.

The program mount and the memory address are coupled by a register 55 to a count processing circuit 56 and a constant memory 57, respectively, in logic stage 5. Registers in the final register stage of the function unit, couple the current program count and current data address to the output formatter 47.

An output register section 60 couples the formatted data into the interconnection network for routing to other memory units or function units according to the program count and the address.

The function of the register stages 28 and 62 through 65 in response to the operational code (OP CODE) is to decode and start data in communication with other registers in the same register stages, while providing control of the other register functions.

Multi-stage Interconnection Network

Figure 11:
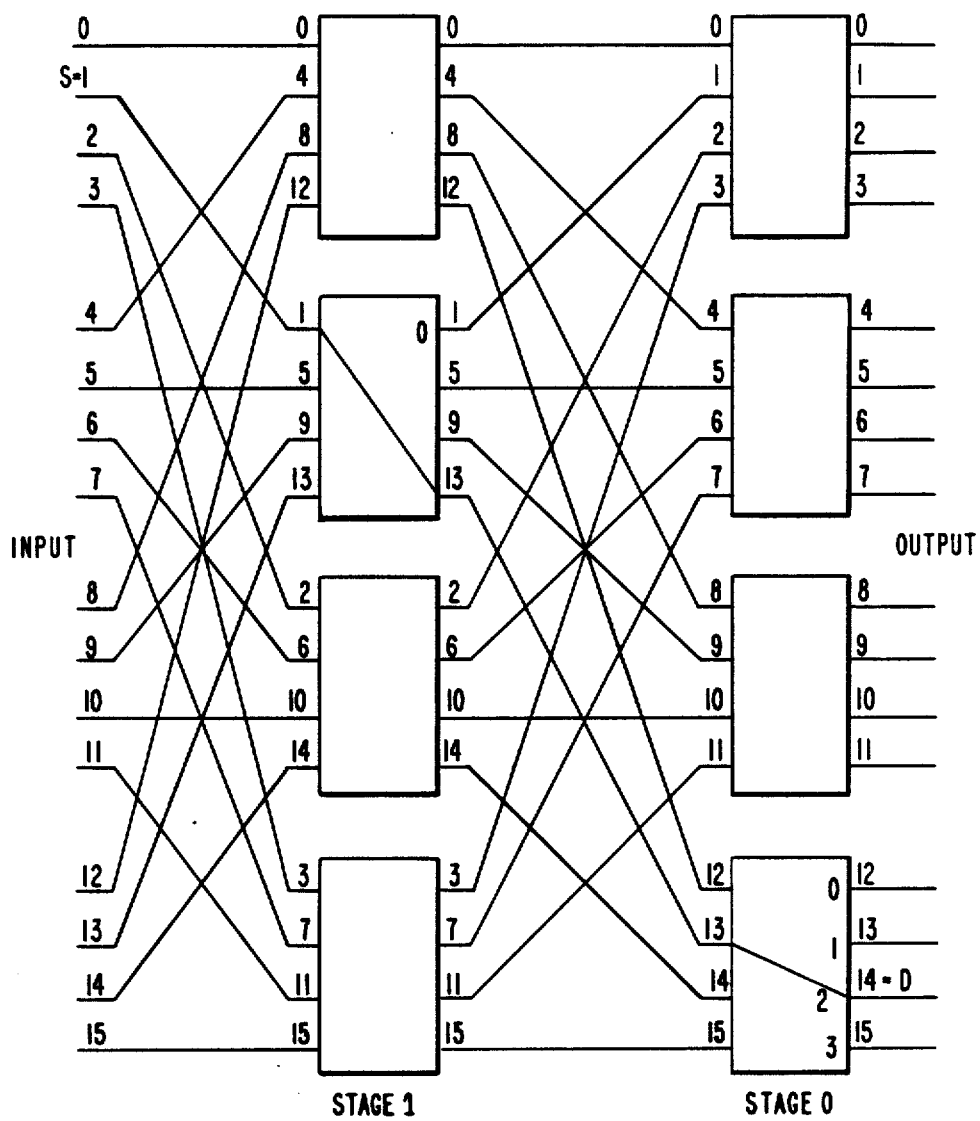
FIG. 11 is a block diagram of a 16×16 multi-stage interconnection network constructed from 4×4 switch nodes.

An example of a small section of a multi-stage interconnection network comprising a portion of a multi-stage interconnection network of an instruction flow computer, such as illustrated in FIG. 2, is illustrated in FIG. 11. This is a 16 by 16 multi-stage interconnection network constructed from two stages of 4 by 4 switch nodes. The coupling of input port 1 to output port 14 is shown. In this arrangement information packet switching is used. Packet switching is a mode of communication in which relatively small fixed sized units of information called "packets" move from switch node to switch node as paths between the nodes become available. They do not require their entire path to be established prior to entry in the network. The packets consist of a header containing routing information and some data or commands, as illustrated in FIGS. 4 and 6. For some applications, the packet may contain the instruction for the entire path. For others, only a pointer is required. Packet switching lends itself to applications where the basic unit of information transmitted is small and the communication pattern of the processors changes rapidly during the course of a computation. Packet switching also produces a pipelining effect that a properly designed system can exploit to achieve a very high performance.

This multi-stage interconnection network is constructed from 4 by 4 switch nodes. An N by N multi-stage interconnection network, where N is the number of input ports, constructed from B×B switch nodes has C(LOG$_B$N) stages of C(N/B) switch nodes each (C1a), or the ceiling function, and is equal to the smallest integer not less than (a). As B increases, both the number of stages and the number of switch nodes per stage decreases. Thus, it is desirable to make B as large as possible to reduce the input to output delay and potentially the component count. The limiting factor on the size of B is the switch node complexity. Because it is a packet switched cross bar, its complexity grows exponentially as a function of B.

An important characteristic of the network is that it is controllable in a distributed fashion, which is accomplished by using routing tags (see FIG. 4). Each switch node determines how to route the packets received by examining a portion of the routing tag in each packet. The form of the tag is determined by the size of the switch node and the number of stages in the network. If B×B switch nodes are used, the tag is formed by representing the desired destination address in base B digits.

In the 16 by 16 network shown in FIG. 11 constructed from 4 by 4 switching elements, there are 16/4=4 switch nodes per stage and LOG$_4$16=2 stages. The routing tag for this network is formed by representing the desired destination in base 4. The example shown in FIG. 11 is a route from source address port 1 to destination port 14=32$_4$. There is a digit associated with each stage that selects one of four outputs numbered from 0 to 3. In FIG. 11, the most significant digit is examined by the switch node in stage 1 and the least significant digit is examined in stage 0.

Because the base, B=4, is a power of 2, each base 4 digit can be represented in binary with 2 bits. Thus, in the previous example, the routing tag 32$_4$ can be represented in binary as 11$_2$, 10$_2$. When these bits are concatenated to form 1110, the binary representation of 14 is obtained. No calculations are therefore necessary to obtain a routing tag for a network constructed from 4 by 4 switch nodes. Each switch node simply examines 2 bits of the tag to determine how to route the associated packet.

Multi-port Memory Switch Node

Figure 12:
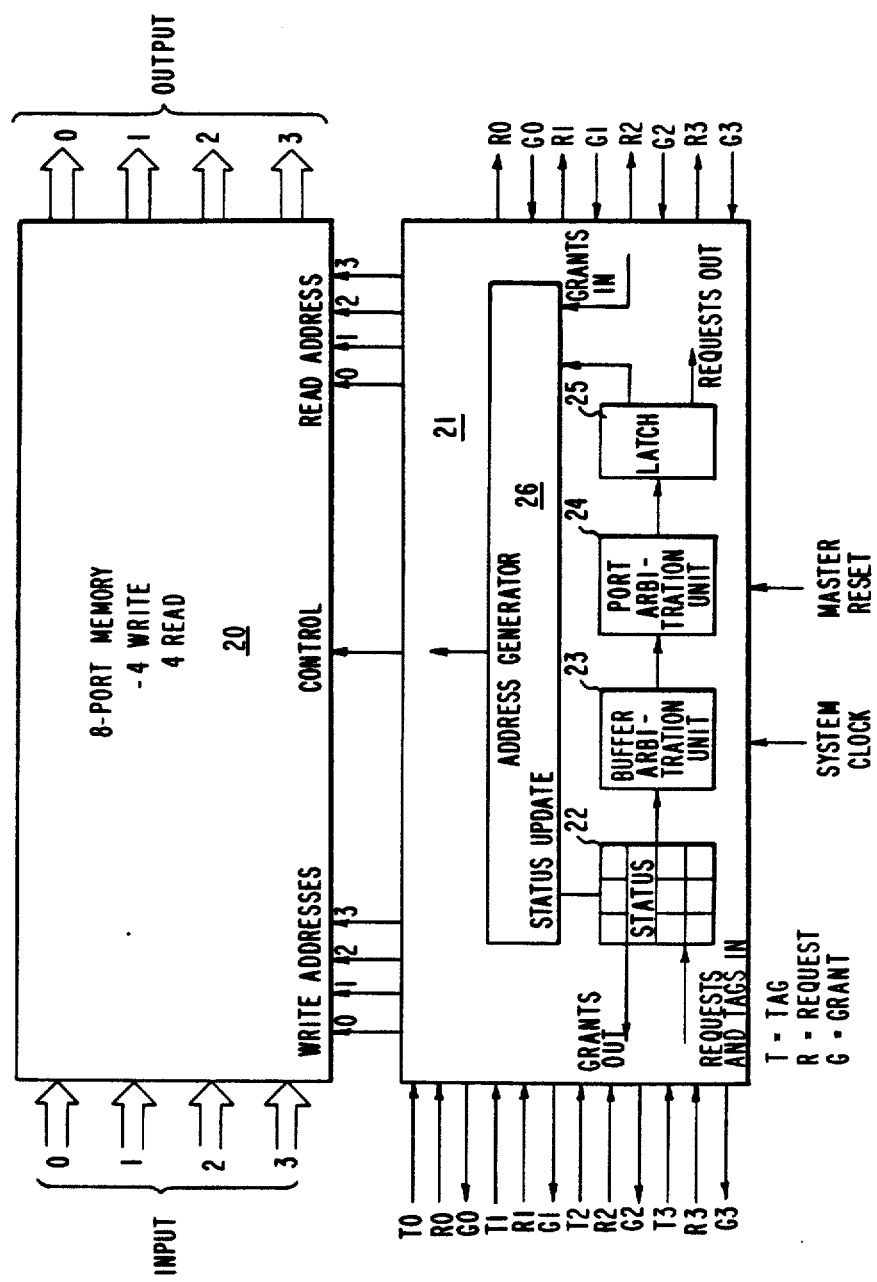
FIG. 12 is a block diagram of a 4×4 multi-ported memory switch node.

A 4 by 4 multi-port memory switch node is shown in FIG. 12. This switch node comprises an 8 port, 12 word memory 20 and a control logic section 21. Each of the 4 input (write) ports has exclusive access to three words of memory, whereas each of the output (read) ports has independent access to all words.

The control logic 21 performs hand shaking with other switch nodes to which it is connected, generates addresses into the multi-port memory and arbitrates among packets of information. All incoming requests (R$_1$, R$_2$...) to the switch node are accompanied by the tag bits that node will need to examine. For the 4 by 4 design, 2 bits are required. These bits along with a full-/empty status bit are stored in a status register 22 with 12 cells. Each cell corresponds to a memory location and can store the tag and status bits. Priority encoder logic picks the first available of the three cells (for a given input port) when a request is received on a request line (R). As long as the 3 status is received on a all "full," a grant output signal appears on one of the grant lines (G1, G2 ... ). The requesting information packet is then written into its assigned location in the 8 port memory 20. The tag bits are written into the status register 22 and the corresponding full/empty bit is set to "full."

Arbitration among packets takes place in two steps. First, all the tag bits in full cells are decoded and grouped according to the desired output port. Then a buffer arbitration unit 23 randomly chooses between any packets that entered the same input port that also want the same output port. In the second step, a port arbitration unit 24 randomly chooses between any packets that want the same output port. As long as packets that entered the same input port want different output ports, all are allowed to participate in the second step of arbitration. Thus, no packets are blocked due to their position in memory. A packet can only be blocked due to competition with another packet for the same output port.

A latching circuit 25 latches the results of the arbitration process and requests are generated for those output ports desired by packets. Appropriate read addresses are generated by the address generation section 26 for each output port that is to be used. For those requests that are granted, the appropriate full/empty status bits are reset to "empty." If any request is not granted, the packet remains in memory and repeats the arbitration process during the next cycle. This approach can be used with one or multiple words per information packet. The design of this switch node assumes 4 words per information packet.

The switch nodes generally described here may be described as cube types of switch nodes and the networks as cube types of networks. Networks of this general type are described in a paper entitled "The Hybrid Cube Network" by Robert J. McMillen and Howard Jay Siegel, CH 1571-9/80/0000-0011, 1980, *IEEE*, and a second paper entitled "Performance and Implementation of 4 by 4 Switching Nodes in an Interconnection Network for PASM," by Robert J. McMillen, George B. Adams, III, and Howard Jay Siegel, 0190-3918/81/0000/0229, 1981, *IEEE*.

This network is further described in detail in a copending application of Robert J. McMillen and Andrew Rosman, Ser. No. 06/661,996, filed 10-18-84, and assigned to the assignee of this invention referenced hereinbefore.

This instruction flow computer is well suited to execute parallel software. Ideally, this architecture allows the hardware to run at full clock rate without any component, except unaddressed memory, ever being idle. This speed is achievable, because all phases of instruction execution (instruction fetch, decode, operand address generation, operand fetch, execution, result write, and relink) are overlapped within independent shared resources. These resources (e.g., a PFU) can all execute at the basic clock rate through pipelined hardware. By designing all the pipelined segments with the same throughput rate of one clock, the individual resources in the computer appear as fall-through first in/first outs. The whole computer then appears as a model of a fluid flowing through a maze of pipes, where the flow is maintained constant throughout. The usual problems which cause pipeline execution to "spatter", such as precedence constraint, branching, or cache misses, are avoided.

What is claimed is:

1. An instruction flow computer, comprising:
  process control units, each having a set of processes, each process having sequential instructions;

function units;

memory units;

an interconnection network interconnecting said process control units, said function units and said memory units in parallel paths for providing communication among the units on the interconnection network;

means forming part of at least one process control unit for initiating a first process of said set of processes having said sequential instructions, at said at least one of said process control units; and means forming part of said at least one process control unit responsive to initiation of said first process for routing the first instruction of said sequential instructions of said first process via said interconnection network to others of said units, wherein said means for routing routes the first instruction of said sequential instructions of said first process to proceed in sequence from said process control unit, to a memory unit for fetching data, to a function unit for processing and back to said process control unit.

2. Ann instruction flow computer according to claim 1, in which, said interconnection network interconnects said process control units, said function units and said memory units so that all communication among said units takes place on said interconnection network.

3. An instruction flow computer according to claim 1, wherein the last recited means additionally comprises:

means for initiating a second process by said at least one of said process control units and routing the first instruction thereof on said interconnection network while said first instruction of said first process is moving through said interconnection network.

4. An instruction flow computer according to claim 1, wherein said means for routing the first instruction, comprises:

means for initiating the next instruction of the sequence of instructions of said first process at a process control unit only upon the return of the preceding instruction to said process control unit.

5. An instruction flow computer according to claim 1, in which:

said interconnection network comprises a multi-stage interconnection network constructed from $N \times M$ packet switched nodes;

said interconnection network having input ports and output ports to which said units are individually connected.

6. An instruction flow computer according to claim 1, in which:

said function units are programmable function units, selected ones of said programmable function units including a program memory.

7. An instruction flow computer according to claim 6, in which said programmable function units each include a constant memory.

8. An instruction flow computer according to claim 1, including:

means at each process control unit for successively initiating the first instruction of each process of said set of processes until all processes of said set have been initiated.

9. An instruction flow computer according to claim 1, in which said interconnection network provides parallel data processing paths individually comprising:

a process control unit;

at least one memory unit; and at least one function unit, and further in which, each process control unit initiates at least one process having an independent block of sequential instructions and further wherein each instruction in each of said parallel data processing paths is completed and returned to the initiating process control unit before the next instruction of the sequence of instructions of that process is initiated.

* * * * *